Patented Aug. 5, 1947

2,425,238

UNITED STATES PATENT OFFICE 2,425,238

FUMIGANT MIXTURES OF ETHYLENE BROMIDE AND METHYLENE CHLORIDE

Fred W. Fletcher and Eugene Kenaga, Midland, Mich., assignors to The Dow Chemical Company, Midland, Mich., a corporation of Michigan No Drawing. Application January 1, 1945, Serial No. 571,018

3 Claims. (Cl. 99—225)

This invention relates to fumigants and is particularly concerned with new and improved mixtures and to a method for fumigating insect infested grain.

Many volatile organic compounds have been suggested as fumigants and particularly for the treatment of stored grain. Control of insect infestation is conveniently accomplished by applying the fumigant toxicant in liquid form upon the surface of the grain and permitting the fumes to pass downwardly through the body of the stored product. However, many common liquid fumigants are selective in their action and are effective against only a few of the major grain infesting insects. Other toxicants are adsorbed or absorbed by the grain in such quantity as to impart undesirable taste and odor characteristics to flour prepared therefrom, whereby baked goods containing the flour are unpalatable. Still other suggested fumigant materials are explosive or adversely affect the germinating properties of the grain.

A particularly disadvantageous feature in the conventional use of many known fumigant compositions is the failure of the latter to control insect infestation at all levels of the stored grain. Thus a material which in laboratory or experimental operations may control common grain infesting insects at low toxicant concentrations, in large scale treatmet of deep bins and granaries may give surface kill only or be effective only through the middle or at the bottom of the stored grain mass. Since the survival of even a few live insects permits the rapid build-up of the infesting organisms, such fumigants are generally unsatisfactory. To avoid the irregular results attributable to stratification of fumigant vapors, large excesses of the toxicant are frequently employed. While this may accomplish an improved kill of insects, the practice is economically unattractive and the resulting high concentrations of toxicant increase the possibility of injury to the grain.

It is an object of the present invention to provide a new and improved fumigant composition which will control grain insects generally. It is a further object to provide a such composition which will not be subject to the disadvantages in use which have characterized many known materials. It is an additional object to provide a fumigant mixture which will be effective at lower concentrations than many known fumigants and will accomplish the total kill of insects without imparting undesirable properties to the treated grain. A further object is to provide a method for the fumigation of stored grain which will accomplish a complete kill of insects at all levels in the grain. Other objects will become apparent from the following specification and examples.

According to the present invention, improved fumigant mixtures are provided which comprise as a major toxic ingredient a solution of ethylene bromide in methylene chloride. These new fumigants have been found superior with respect to their control of grain parasites, particularly in bin fumigations. A further advantage resides in the fact that with such compositions, the use of high pressure containers and special applicators, as required with many volatile organic materials is avoided. Also, the compositions do not adversely affect the germinating properties of the treated grain or impart odor or taste thereto. The compositions are substantially non-flammable.

The invention further provides a procedure whereby grain stored in bins is treated with the new ethylene bromide-methylene chloride mixture to obtain an economical, efficient, and complete control of weevils, borers, and beetles. This procedure comprises introducing the fumigant mixture into the top of a filled bin, granary, elevator, etc., and onto the surface of the grain. The vapor pressures of the new mixtures are such that a gradual distribution and penetration of the toxic fumes is obtained throughout the limits of the confining structure. The susbtantial absence of undesirable vapor stratification or channeling effect avoids the inconsistent control frequently obtained with many liquid organic fumigant materials.

Any substantial amount of ethylene bromide may be employed with the methylene chloride to obtain compositions of improved properties. The preferred range of proportion consists of from 2.5 to 20 parts by volume of ethylene bromide dissolved in from 97.5 to 80 parts by volume of methylene chloride, and optimum results have been obtained with compositions containing from 5 to 20 per cent by volume of the ethylene bromide. With such mixtures 100 per cent control at all levels of stored grain has been obtained under a variety of temperature conditions. A definite synergistic effect as regards insect toxicity has been observed for these compositions.

The amounts of the new compositions required to accomplish control of insects at all levels of the stored grain are relatively small. From about 1 to 3 gallons of the mixture per 1000 bushels of grain gives complete control of common weevil and beetle pests. Even smaller amounts are effective in shallow bins or where other known fumigants are employed in combination therewith.

While the foregoing description is directed particularly to the bin fumigation of grain, it is to be understood that the new fumigant products may also be employed in vault fumigation, household fumigation, and the like, wherever a highly effective non-explosive toxicant material is required. In such use the compositions are superior to hydrogen cyanide by reason of reduced toxicity to humans and greater ease of handling.

The following examples illustrate the invention but are not to be construed as limiting the same:

EXAMPLE 1

Varying amounts of ethylene bromide were dissolved in methylene chloride to obtain liquid fumigant mixtures. These products were sprinkled on the surface of wheat stored in an airtight bin 10 feet in depth. Caged Tribolium confusum adults (confused flour beetle) were dispersed in and through the grain at various levels prior to application of the fumigant. After application of the toxic mixture, the bin was closed and allowed to stand for 3 days. The caged insects were then removed from the grain and examined to determine the degree of control accomplished. The following table sets forth the results obtained with the several compositions.

Table I

| Per Cent by Volume Ethylene Bromide | Per Cent by Volume Methylene Chloride | Amount of Mixture Per 1,000 Bushels of Grain | Per Cent Surface Kill | Per Cent Kill at 5 ft. Level | Per Cent Kill at 10 ft. Level |
|---|---|---|---|---|---|
| | | Gals. | | | |
| 100 | 0 | 3.36 | 100 | 87 | 31 |
| 100 | 0 | 4.48 | 100 | 100 | 31 |
| 100 | 0 | 5.6 | 100 | 100 | 37 |
| 100 | 0 | 6.7 | 100 | 100 | 100 |
| 2.5 | 97.5 | 2.0 | 88 | 100 | 100 |
| 5.0 | 95.0 | 2.0 | 100 | 100 | 100 |
| 10.0 | 90.0 | 2.0 | 100 | 100 | 100 |
| 20.0 | 80.0 | 2.0 | 100 | 100 | 98 |
| 30.0 | 70.0 | 2.0 | 100 | 100 | 33 |
| 0 | 100 | 2.0 | 0 | 56 | 14 |

EXAMPLE 2

In a similar fashion solutions of ethylene bromide in methylene chloride were applied to wheat bins for the control of rice weevil. The following table sets forth the results obtained:

Table II

| Per Cent by Volume Ethylene Bromide | Per Cent by Volume Methylene Chloride | Amount of Mixture Per 1,000 Bushels of Grain | Per Cent Surface Kill | Per Cent Kill at 5 ft. Level | Per Cent Kill at 10 ft. Level |
|---|---|---|---|---|---|
| | | Gals. | | | |
| 100 | 0 | 3 | 100 | 90 | |
| 100 | 0 | 4 | 100 | 100 | 14 |
| 2.5 | 97.5 | 2 | 100 | 100 | 100 |
| 5.0 | 95.0 | 2 | 100 | 100 | 100 |
| 10.0 | 90.0 | 2 | 100 | 100 | 100 |
| 20.0 | 80.0 | 2 | 100 | 100 | 100 |
| 30.0 | 70.0 | 2 | 100 | 100 | 50 |

EXAMPLE 3

Other compositions which may be employed substantially as described in the foregoing examples for the control of organisms in stored wheat, corn, rice, barley, buckwheat, oats, rye, etc., or for vault or chamber fumigation of insect infested articles and products include the following:

Composition A

| | Parts by volume |
|---|---|
| Ethylene bromide | 10 |
| Methylene chloride | 70 |
| Carbon tetrachloride | 20 |

Composition B

| | | |
|---|---|---|
| Ethylene bromide | gallons | 1 |
| Methylene chloride | do | 15 |
| Chloropicrin | pounds | 30 |

Composition C

| | | |
|---|---|---|
| Ethylene bromide | gallons | 1 |
| Methylene chloride | do | 10 |
| 1.1-dichloro-1-nitroethane (Ethide) | pounds | 20 |

Composition D

| | | |
|---|---|---|
| Ethylene bromide | gallons | 1 |
| Methylene chloride | do | 25 |
| Beta-methallyl-chloride | pounds | 25 |

Compoistion E

| | Gallons |
|---|---|
| Ethylene bromide | 1 |
| Methylene chloride | 10 |
| Ethylene chloride | 10 |

We claim:

1. In a method for fumigating insect infested grain stored in bins, the step of introducing a volatile fumigant comprising as a major toxic ingredient a solution of from 2.5 to 20 per cent by volume of ethylene bromide in methylene chloride at the top of the bin and onto the surface of the stored grain.

2. A fumigant composition including as an active toxic ingredient a solution of from 2.5 to 20 per cent by volume of ethylene bromide in methylene chloride.

3. A fumigant composition comprising a volatile liquid including a solution of from 5 to 20 per cent by volume of ethylene bromide in methylene chloride.

FRED W. FLETCHER.
EUGENE KENAGA.

REFERENCES CITED

The following references are of record in the file of this patent:

UNITED STATES PATENTS

| Number | Name | Date |
|---|---|---|
| 2,324,471 | Allen et al. | July 20, 1943 |
| 2,324,472 | Allen et al. | July 20, 1943 |
| 1,920,026 | Tischler | July 25, 1933 |